United States Patent
Han et al.

(10) Patent No.: US 12,299,284 B2
(45) Date of Patent: May 13, 2025

(54) ROUTING SCHEME FOR HETEROGENEOUS INTERCONNECTED-CHIP NETWORKS USING DISTRIBUTED SHARED MEMORY

(71) Applicant: Alibaba (China) Co., Ltd., Hangzhou (CN)

(72) Inventors: Liang Han, Campbell, CA (US); Yunxiao Zou, Shanghai (CN)

(73) Assignee: T-Head (Shanghai) Semiconductor Co., Ltd., Shanghai Free Trade Area (CN)

( * ) Notice: Subject to any disclaimer, the term of this patent is extended or adjusted under 35 U.S.C. 154(b) by 0 days.

(21) Appl. No.: 17/824,804

(22) Filed: May 25, 2022

(65) Prior Publication Data

US 2023/0176737 A1 Jun. 8, 2023

(30) Foreign Application Priority Data

Dec. 2, 2021 (CN) .......................... 202111459070.X (51) Int. Cl.
*G06F 3/06* (2006.01)
(52) U.S. Cl.
CPC .......... *G06F 3/0611* (2013.01); *G06F 3/0644* (2013.01); *G06F 3/0673* (2013.01)
(58) Field of Classification Search
CPC .... G06F 3/0611; G06F 3/0644; G06F 3/0673; G06F 3/061; G06F 3/0635; G06F 11/07; G06F 3/067
See application file for complete search history.

(56) References Cited

U.S. PATENT DOCUMENTS

| | | | |
|---|---|---|---|
| 10,580,190 B2 | 3/2020 | S. | |
| 10,635,631 B2 | 4/2020 | Hutton et al. | |
| 10,915,328 B2 | 2/2021 | Pearce et al. | |
| 11,093,277 B2 | 8/2021 | Sankaran et al. | |
| 11,211,334 B2 | 12/2021 | Lin et al. | |
| 11,354,135 B2 | 6/2022 | Qin et al. | |
| 11,487,541 B2 | 11/2022 | Corbal et al. | |
| 11,693,691 B2 | 7/2023 | Sankaran et al. | |
| 2007/0283115 A1* | 12/2007 | Freeman | G06F 12/1475 711/163 |
| 2010/0325257 A1* | 12/2010 | Goel | H04L 61/103 709/244 |
| 2017/0286169 A1 | 10/2017 | Ravindran et al. | |
| 2018/0212900 A1* | 7/2018 | Yang | H04L 49/25 |
| 2019/0122415 A1 | 4/2019 | S. | |
| 2019/0138890 A1 | 5/2019 | Liang et al. | |
| 2020/0192676 A1 | 6/2020 | Pearce et al. | |
| 2020/0249957 A1 | 8/2020 | Qin et al. | |
| 2020/0401440 A1 | 12/2020 | Sankaran et al. | |
| 2021/0081198 A1 | 3/2021 | Corbal et al. | |
| 2022/0164218 A1 | 5/2022 | Sankaran et al. | |
| 2023/0083705 A1 | 3/2023 | Corbal et al. | |

(Continued)

*Primary Examiner* — Tasnima Matin (57) ABSTRACT

The time required to read from and write to multi-terabyte memory chips in an inter-chip network can be reduced by breaking each memory chip into a number of memory spaces, and then individually addressing each memory space with an address that identifies the memory space, a line number within the memory space, and a number of transmit/receive ports to be used to access the line number.

20 Claims, 4 Drawing Sheets

(56) References Cited

U.S. PATENT DOCUMENTS

| | | | |
|---|---|---|---|
| 2023/0089800 A1* | 3/2023 | Chadalavada | G06F 11/2236 714/724 |
| 2023/0244626 A1* | 8/2023 | Han | G06F 13/4068 710/305 |

* cited by examiner

ROUTING SCHEME FOR HETEROGENEOUS INTERCONNECTED-CHIP NETWORKS USING DISTRIBUTED SHARED MEMORY

CROSS-REFERENCE TO RELATED APPLICATION

This patent application claims priority to China Patent Application No. 202111459070. X filed Dec. 2, 2021 by Liang HAN et al., which is hereby incorporated by reference in its entirety.

BACKGROUND OF THE INVENTION

1. Field of the Invention

The present invention relates to a routing scheme for an interconnected-chip network and, more particularly, to a routing scheme for a heterogeneous interconnected-chip network that uses a distributed shared memory.

2. Description of the Related Art

A homogeneous interconnected-chip network is a network that couples together a number of substantially identical chips, while a heterogeneous interconnected-chip network couples together a number of different chips. For example, a large-scale processing system could include a large number of parallel processing chips and a large number of multi-terabyte memory chips that are directly and indirectly coupled together by a heterogeneous interconnected-chip network.

In one example of a conventional routing scheme, each of the chips in a heterogeneous interconnected-chip network has a routing table that utilizes a memory address to identify another chip in the network, a line of shared memory within the chip, and one or more ports to be used when transferring data to/from the line of shared memory.

One drawback of this type of routing scheme in a heterogeneous interconnected-chip network is that it can take a substantial amount of time to write to or read from a line of shared memory in a multi-terabyte memory. Thus, there is a need for a routing scheme that takes less time to write to or read from a line of memory in a multi-terabyte memory.

SUMMARY OF THE INVENTION

The present invention provides a routing scheme that reduces the latency associated with transferring data to and from a multi-terabyte memory. The present invention includes a parallel processing unit that has a core, a cache coupled to the core, and a processor memory coupled to the core. The parallel processing unit also has an inter-chip network (ICN) controller that is coupled to the core. The ICN controller to have a routing table. The routing table to have a plurality of addresses that identify a plurality of memory spaces in a plurality of devices that are directly and indirectly coupled to the parallel processing unit. The plurality of memory spaces in the devices to have an equal size. Each address to identify a line of memory in a memory space.

The present invention also includes a processing system that has a plurality of parallel processing units. Each parallel processing unit to include a core, a cache coupled to the core, and a processor memory coupled to the core. Each parallel processing unit to also include an inter-chip network (ICN) controller that is coupled to the core. The ICN controller to have a first routing table. The first routing table to have a plurality of addresses that identify a plurality of memory spaces in a plurality of devices that are directly and indirectly coupled to the parallel processing unit. The plurality of memory spaces in the devices to have an equal size. Each address to identify a line of memory in a memory space. The processing system also has a plurality of external units that are directly and indirectly coupled to the plurality of parallel processing units. Each external unit to include an extension memory such that the plurality of external units has a plurality of extension memories. The extension memory in each external unit to include a plurality of memory spaces. The plurality of memory spaces in the extension memories to have an equal size. The extension memory to have a second routing table. The first routing table to have a first plurality of addresses that identify the plurality of memory spaces in each extension memory. Each address to identify a line of memory in a memory space.

The present invention further includes a method of forming a parallel processing unit. The method includes forming a core, forming a cache coupled to the core, and forming a processor memory coupled to the core. The method further includes forming a routing table to have a plurality of addresses that identify a plurality of memory spaces in a plurality of devices that are directly and indirectly coupled to the parallel processing unit. The plurality of memory spaces in the devices to have an equal size. Each address to identify a line of memory in a memory space.

A better understanding of the features and advantages of the present invention will be obtained by reference to the following detailed description and accompanying drawings which set forth an illustrative embodiment in which the principals of the invention are utilized.

BRIEF DESCRIPTION OF THE DRAWINGS

The accompanying drawings described herein are used for providing further understanding of the present application and constitute a part of the present application. Exemplary embodiments of the present application and the description thereof are used for explaining the present application and do not constitute limitations on the present application.

DETAILED DESCRIPTION OF THE INVENTION

FIGS. 1A-1D show block diagrams that illustrate examples of four topologies of a processing system 100 in accordance with the present invention. As described in greater detail below, processing system 100 individually addresses each shared memory space to reduce the latency associated with transferring data to and from a memory.

As shown in FIGS. 1A-1D, processing system 100 includes a number of parallel processing units (PPU) 110, and a number of external units (SMX) 112 that are directly and indirectly coupled to the PPUs 110. As further shown in FIGS. 1A-1D, the PPUs 110 and the SMXs 112 can be coupled together in a number of different ways.

Figure 1A:
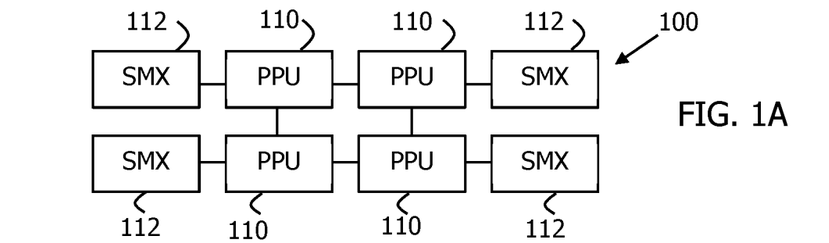
FIGS. 1A-1D are block diagrams illustrating examples of four topologies of a processing system 100 in accordance with the present invention.
Figure 1B:
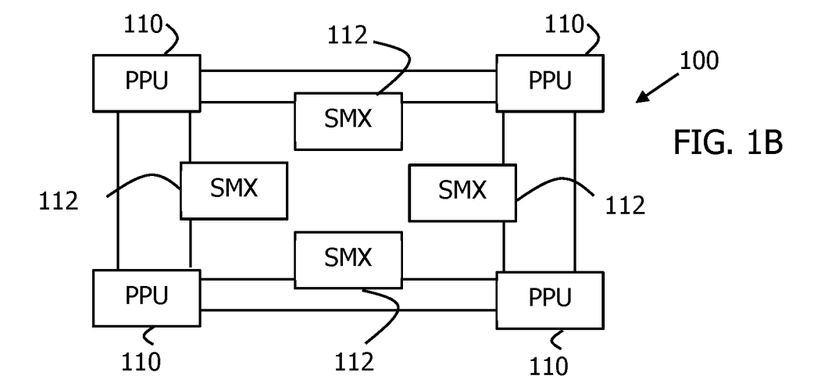
Figure 1C:
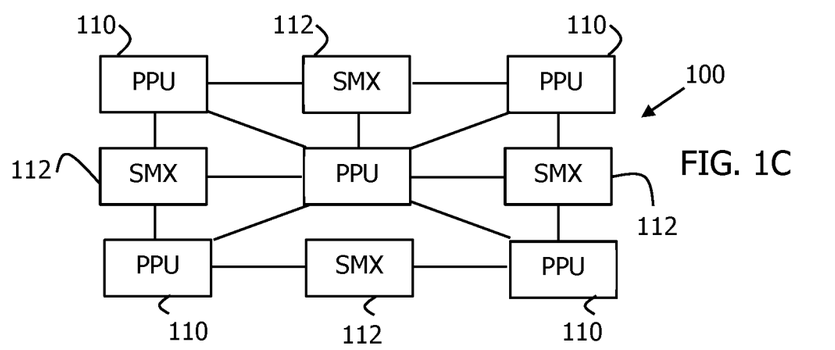
Figure 1D:
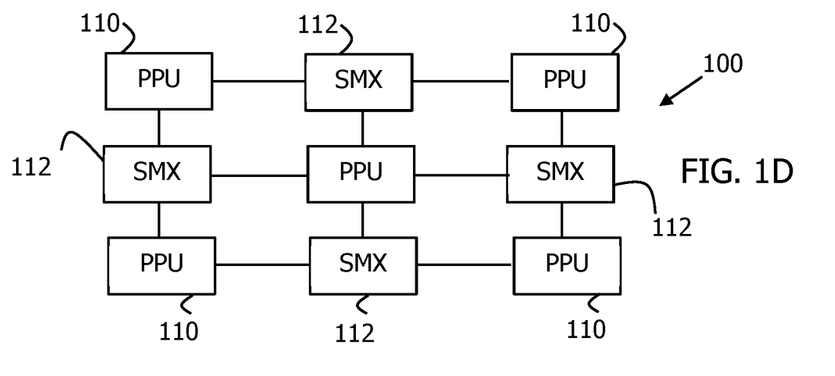
Figure 2:
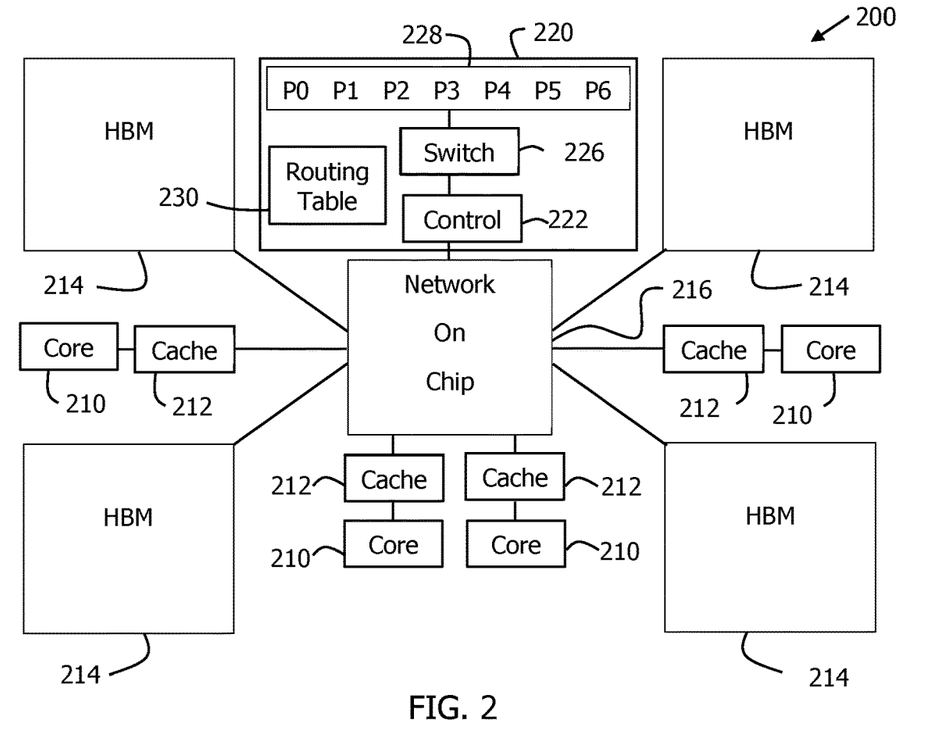
FIG. 2 is a block diagram illustrating an example of a parallel processing unit (PPU) 200 in accordance with the present invention.

FIG. 2 shows a block diagram that illustrates an example of a parallel processing unit (PPU) 200 in accordance with the present invention. In the present example, each PPU 110 can be implemented with PPU 200. As shown in FIG. 2, PPU 200 includes a number of cores 210 (four in the present example), and a number of local caches 212 that are coupled to the cores 210 such that each core 210 has a corresponding local cache 212.

As further shown in FIG. 2, PPU 200 also includes a number of processor memories (HBM) 214 that are coupled to the cores 210 such that each core 210 has a corresponding HBM 214. The HBMs can be implemented in a number of ways. In one example, a HBM is implemented as a high bandwidth memory that includes a number of dynamic random-access memory (DRAM) dies that are vertically stacked on top of each other to provide a large storage capacity with a small form factor, and also includes two 128-bit data channels per die to provide a high bandwidth. HBMs can have, for example, maximum sizes of 4 GB, 24 GB, and 64 GB.

Each HBM 214 is partitioned into first and second address ranges such that a first address range is accessible by only the core 210 that is associated with the HBM 214, while a second address range is accessible by all of the cores 210 on PPU 200 as well as the cores in the other PPUs in the processing system, such as the other PPUs 110 in processing system 100, as a shared address range.

In the present example, the shared second address range in a PPU is addressed as a 256 GB memory space, although only a smaller amount, such as 64 GB, is actually available. In other words, each PPU has a shared memory space that is addressed as a 256 GB memory space, but which can have less-than 256 GB of space available. In addition, each addressable 256 GB memory space represents a virtual device ID.

PPU 200 also includes a network-on-chip (NoC) 216 that couples together the cores 210 and the HBMs 214 to provide a high bandwidth, high-speed communication path between the cores 210 and the HBMs 214. PPU 200 further includes an inter-chip network (ICN) controller 220 that is coupled to the cores 210 via NoC 216 as well as being directly coupled to a number of other PPUs and SMXs, such as other PPUs 110 and SMXs 112, via an inter-chip network.

ICN controller 220, in turn, includes a communication control circuit 222 that is coupled to the cores 210 via NoC 216, a switch 226, and a number of inter-chip ports 228 that are coupled to switch 226 and directly coupled to the other PPUs and SMXs. In the present example, seven inter-chip ports 228-P0 through 228-P6 are utilized. The ports 228 include transmit and receive circuitry, while control circuit 222 controls the flow of data in and out of the inter-chip ports 228 via switch 226.

In addition, as described in greater detail below, PPU 200 has a routing table 230 that is generated and then stored in ICN controller 220. Initially, routing table 230 is stored in host memory, but is later programmed into routing registers (hardware tables) in ICN controller 220 by a driver. There are two routing registers in ICN controller 220: in control 222 and switch 226. In addition to generating and responding to read and write requests, each PPU 200 also operates as a forwarding device that forwards read/write requests and data from one device to another device.

In other words, routing table 230 identifies the ports 228 in ICN controller 220 that are to be used for communicating with both directly and indirectly connected devices. Further, although not illustrated for purposes of simplicity, PPU 200 can also include additional circuits that are commonly included in processing chips.

Figure 3:
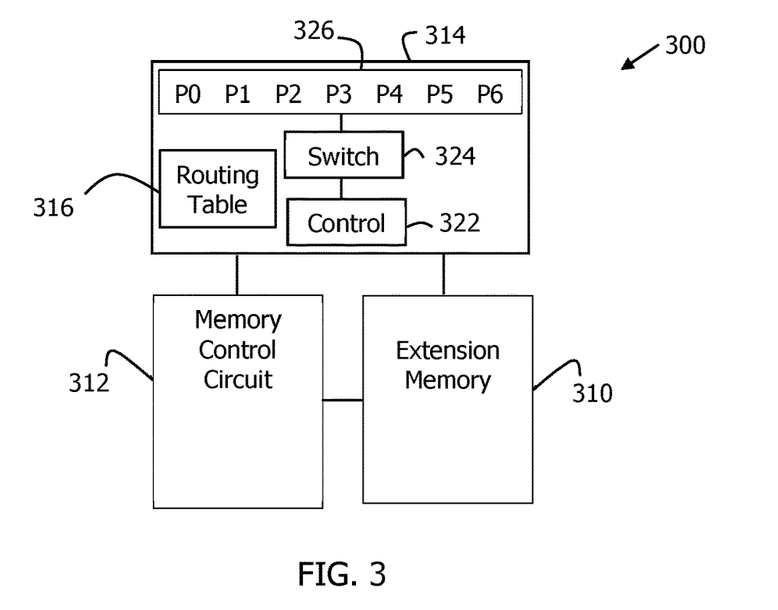
FIG. 3 is a block illustrating an example of an external unit (SMX) 300 in accordance with the present invention.

FIG. 3 shows a block diagram that illustrates an example of an external unit (SMX) 300 in accordance with the present invention. In the present example, each SMX 112 can be implemented with SMX 300. As shown in FIG. 3, SMX 300 includes an extension memory 310, a memory control circuit 312 that is coupled to extension memory 310, and an inter-chip network (ICN) controller 314 that is coupled to extension memory 310, memory control circuit 312, and the inter-chip networks in a number of other directly-coupled PPUs and/or SMXs.

ICN controller 314, which can be implemented in a manner similar to ICN controller 220, includes a communication control circuit 322 that is coupled to extension memory 310 and control circuit 312, a switch 324 that is coupled to control circuit 322, and a number of inter-chip ports 326 that are coupled to switch 324 and one or more directly-coupled devices.

In the present example, seven inter-chip ports 326-P0 through 326-P6 are utilized. Although seven ports are illustrated, one is sufficient to provide basic access (as a slave device). Additional ports provide additional bandwidth. In addition, switch 324 is not required. If present, that SMX can further serve as a bridge to forward data packages, otherwise that SMX can simply serve as an end-device simply providing accessibility. In short, the port number of a SMX is independent and the switch is optional and up to the IP designer of the SMX. The ports 326 include transmit and receive circuitry, while control circuit 322 controls the flow of data in and out of the inter-chip ports 326 via switch 324.

Extension memory 310 in SMX 300 includes a number of memory spaces, where the spaces of memory in the extension memories 310 of the SMXs 112 have an equal size. For example, each memory space can have a size of 256 GB. In addition, each 256 GB memory space represents a virtual device ID. In the present example, the address spaces of memory in each extension memory 310 is accessible to each parallel processing unit as a shared memory space.

Further, SMX 300 has a routing table 316 that is generated and then stored in ICN controller 314. Like routing table 230, routing table 316 is programmed into routing registers (hardware tables) in ICN controller 314 by a driver. When control 322 and switch 326 are present, there are two routing registers in ICN controller 314, in control 322 and switch 326.

In addition to receiving read and write requests from the PPUs in the system, each SMX 300 also operates as a forwarding device. Routing table 316 identifies the ports in ICN controller 314 that are to be used for directly and indirectly connected devices when responding to requests as well as forwarding read/write requests and data from one device to another device. Further, although not illustrated for purposes of simplicity, SMX 300 can also include additional circuits that are commonly included in memory chips.

Figure 4:
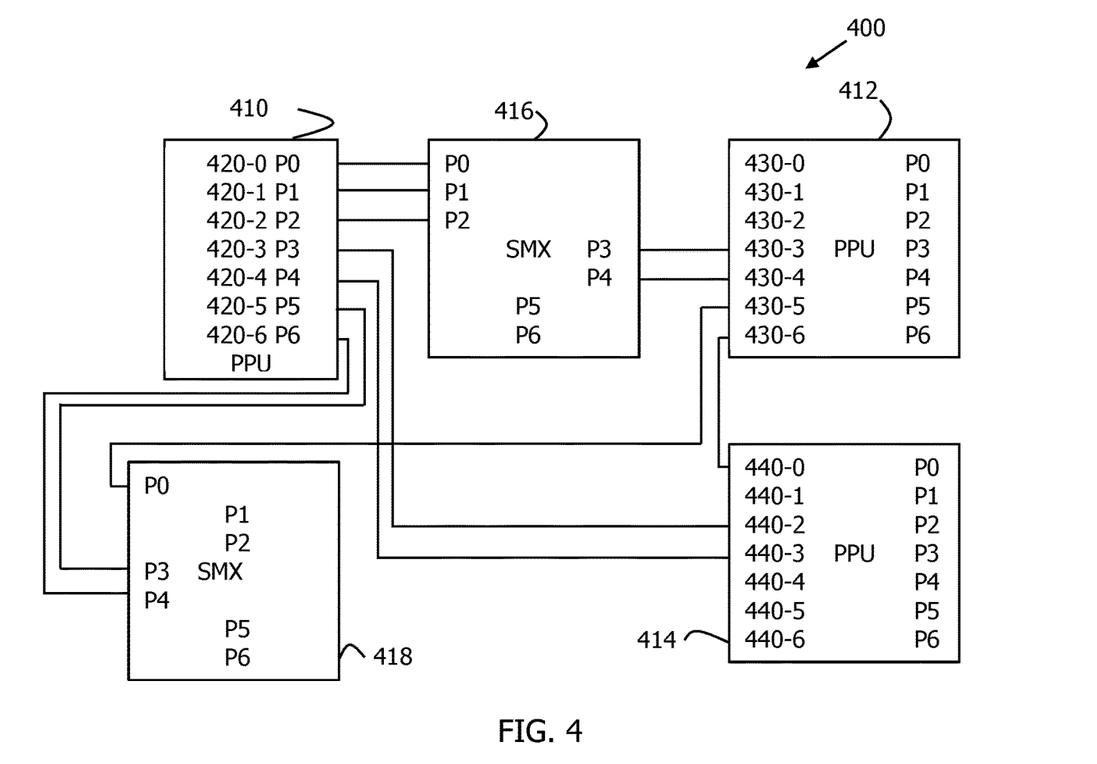
FIG. 4 is a block diagram illustrating an example of a processing system 400 in accordance with the present invention.

FIG. 4 shows a block diagram that illustrates an example of a processing system 400 in accordance with the present invention. In the present example, processing system 400 represents a portion of processing system 100. As shown in FIG. 4, processing system 400 includes three PPUs 410, 412, and 414, and two SMXs 416 and 418.

Further in the present example, PPU 410 is coupled to SMX 416 by way of ports 420-0, 420-1, and 420-2, is coupled to PPU 414 by way of ports 420-3 and 420-4, and is coupled to SMX 418 by way of ports 420-5 and 420-6. PPU 412, in turn, is coupled to SMX 416 by way of ports 430-3 and 430-4, is coupled to PPU 414 by way of port 430-6, and is coupled to SMX 418 by way of port 430-5. PPU 414 is coupled to PPU 412 by way of port 440-0, and is coupled to PPU 410 by way of ports 440-2 and 440-3.

In operation, when data is transferred, large amounts of data can be broken into a number of parts and transferred in parallel to substantially reduce the time required to transfer data. The number of parts that the data is broken into is defined by the minimum number of links between an originating device and a destination device.

In the FIG. 4 example, PPU 410 is coupled to SMX 416 by way of three links and ports, while PPU 412 is coupled to SMX 416 by way of two links and ports, making two the minimum number of links between PPU 410 and PPU 412. In this case, the most efficient data transfer occurs when the data is broken into two parts based on the two minimum links because, although data could be transferred to SMX 416 from PPU 410 in less time when broken into three parts, the bottleneck at SMX 416 caused by three incoming steams being converted into two outgoing streams to be forwarded to PPU 412 requires a greater amount of time.

Figure 5:
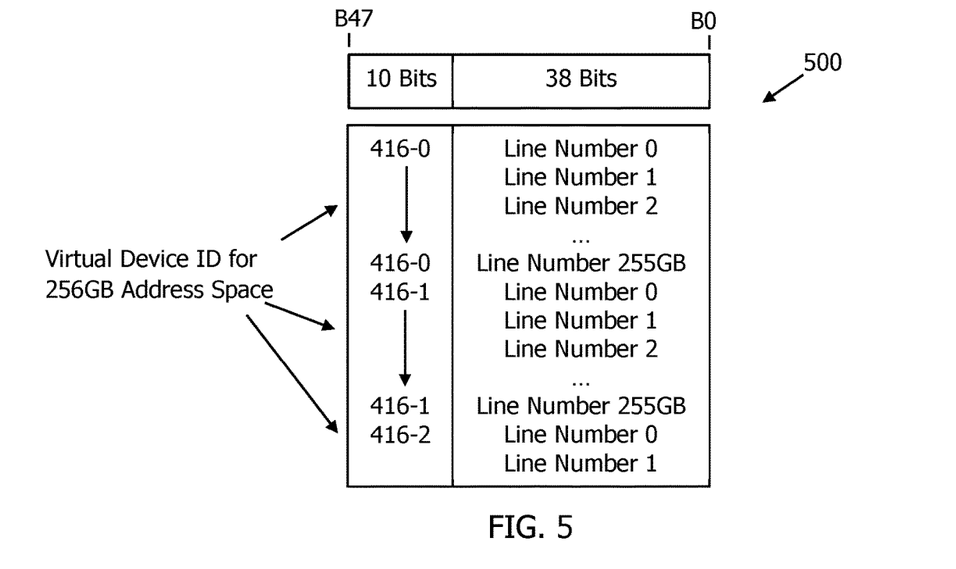
FIG. 5 is a diagram illustrating an example of a memory address 500 in accordance with the present invention.

FIG. 5 shows a diagram that illustrates an example of a memory address 500 in accordance with the present invention. As shown in the FIG. 5 example, memory address 500 has a 48-bit address, where the first ten bits B47-B38 identify 1024 memory spaces of 256 GB that represent 1024 virtual devices. For example, SMX 416 can include 16 memory spaces of 256 GB that represent 16 virtual devices 416-0 through 416-15. In this example, the first ten bits could identify a third 256 GB memory space/virtual device 416-2 in SMX 416, while the remaining 38 bits B37-B0 identify a line in the third 256 GB memory space/virtual device 416-2.

The following TABLE illustrates an example of a routing table in accordance with the present invention. Routing table 230 can be implemented as illustrated in the TABLE, while routing table 316 is also implemented in a similar manner.

TABLE

| From PPU 410 To: | dst ID | | | | | | | |
|---|---|---|---|---|---|---|---|---|
| | minLink | P0 | P1 | P2 | P3 | P4 | P5 | P6 |
| SMX-4160 | 3 | 1 | 1 | 1 | 0 | 0 | 0 | 0 |
| SMX-4161 | 3 | 1 | 1 | 1 | 0 | 0 | 0 | 0 |
| SMX-4162 | 3 | 1 | 1 | 1 | 0 | 0 | 0 | 0 |
| ... | ... | ... | ... | ... | ... | ... | ... | ... |
| SMX-41615 | 3 | 1 | 1 | 1 | 0 | 0 | 0 | 0 |
| PPU-412 | 2 | 1 | 1 | 0 | 0 | 0 | 0 | 0 |
| PPU-414 | 2 | 0 | 0 | 0 | 1 | 1 | 0 | 0 |
| SMX-4180 | 2 | 0 | 0 | 0 | 0 | 0 | 1 | 1 |
| SMX-4181 | 2 | 0 | 0 | 0 | 0 | 0 | 1 | 1 |
| SMX-4182 | 2 | 0 | 0 | 0 | 0 | 0 | 1 | 1 |
| SMX-4183 | 2 | 0 | 0 | 0 | 0 | 0 | 1 | 1 |

As shown, the routing table includes a destination ID (dest ID) column, a minimum link (minLink) column, and seven port columns P0-P6. As further shown, each entry in the dest ID column is a physical 48-bit address that represents a line of memory in a memory space, and identifies the ports to be used to transfer data from PPU 410 to the line of memory.

The first ten bits identifies one of 1024 memory spaces/virtual devices in SMX 416, PPU 412, PPU 414, and SMX 418.

In the present example, each 256 GB memory space represents a different virtual device ID, while each virtual device ID identifies a number of ports to be used to transmit, receive, and forward data to the virtual device. In the present example, SMX 416 has 16 memory spaces of 256 GB that represent 16 virtual device IDs: SMX 416-0 through SMX 416-15. In addition, SMX 418 has 4 memory spaces of 256 GB that represent four virtual device IDs: SMX 418-0 through SMX 418-3.

Further, each address also identifies a line of memory in a memory space, and the ports to be used to transfer data from one device to another device. As additionally shown, PPU 410 to SMX 416 has a minimum link of three, while ports P0-P2 are identified as the three transmit/receive ports, and ports P3-P6 are not.

In addition, the TABLE shows that the shared memory space in each PPU is addressed as one 256 GB memory space, e.g., PPU 412, although only a smaller amount is available to be used. Thus, the routing table has a number of addresses that identify the 256 GB memory spaces in the PPUs and SMXs. The shared memory spaces in the PPUs can be combined with the memory spaces in the SMXs to form a global shared address range for the parallel processing units. The highest 10 bits are virtual device ID, which serves as high bits of a global physical address space.

Figure 6:
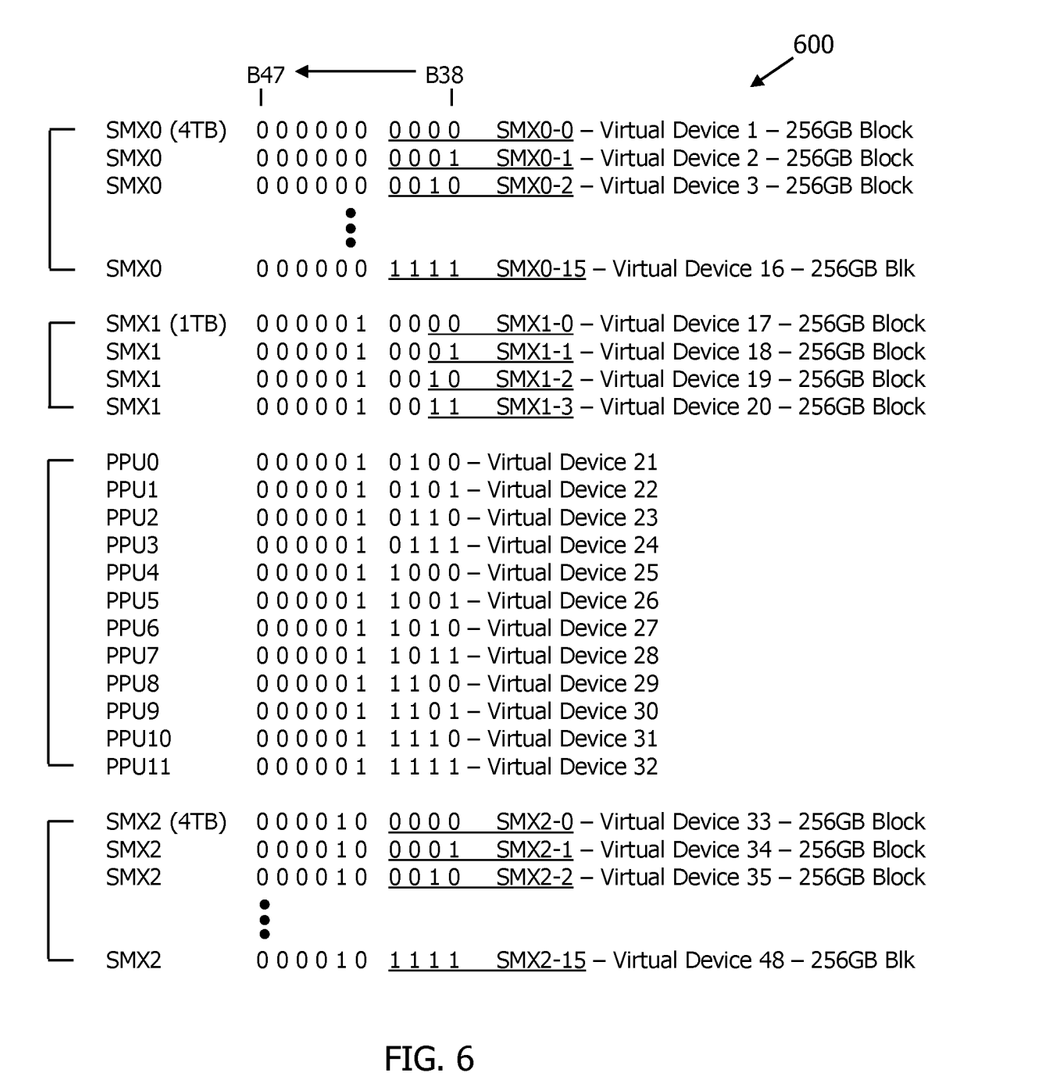
FIG. 6 is a diagram illustrating an example of an address assignment 600 in accordance with the present example.

FIG. 6 shows a diagram that illustrates an example of an address assignment 600 in accordance with the present example. As shown in the FIG. 6 example, an address is assigned to 16 memory spaces of 256 GB in a SMX such that the four least significant bits B41-B38 of the first 10 bits identify the 16 memory spaces of 256 GB. In addition, an address is assigned to the 4 memory spaces of 256 GB in another SMX such that the two least significant bits B39-B38 of the first 10 bits identify the 4 memory spaces of 256 GB.

One of the advantages of the present invention is that by utilizing SMX memories where the SMX memory includes a multiple of 256 GB, and by individually addressing each memory space of 256 GB, the time required to transfer and receive data can be substantially reduced. Although the present invention has been described in terms of memory spaces of 256 GB, other sized memory spaces, such as 512 GB memory spaces, can also be utilized.

In the present example, the routing tables 230 and 316 in the PPUs and SMXs are populated during start-up of the processing system by assigning a static identity to each memory space of 256 GB. The identity can be assigned in a number of ways, such as physically or via software setting an identifying switch, or via self-assigning software where an identity-generating token is passed to each device in the processing system, which then self-assigns a unique identifier before passing the token to a next device in the processing system.

Following this, each PPU outputs a broadcast message to each directly connected PPU and SMX, which responds to the broadcast message by identifying itself, the type of device (PPU, SMX-4 GB, SMX-24 GB, SMX-64 GB), and the address of the device, along with the identities of the PPUs and SMXs to which it is coupled. The address can be used as an index as illustrated in the TABLE.

After several rounds, each PPU and SMX determines one or more paths with one or more hops, including a most efficient path, from each PPU and SMX to each other PPU and SMX in the processing system. After this, each PPU and SMX assigns one or more of the inter-chip ports, such as ports P0-P6, based on path efficiency, and then populates the routing tables 230 and 316 in the PPUs and the SMXs. Additional periodic broadcast messages can be utilized to detect failed or non-functioning devices and maintain up-to-date routing tables.

Reference has now been made in detail to the various embodiments of the present disclosure, examples of which are illustrated in the accompanying drawings. While described in conjunction with the various embodiments, it will be understood that these various embodiments are not intended to limit the present disclosure. On the contrary, the present disclosure is intended to cover alternatives, modifications and equivalents, which may be included within the scope of the present disclosure as construed according to the claims.

Furthermore, in the preceding detailed description of various embodiments of the present disclosure, numerous specific details are set forth in order to provide a thorough understanding of the present disclosure. However, it will be recognized by one of ordinary skill in the art that the present disclosure may be practiced without these specific details or with equivalents thereof. In other instances, well-known methods, procedures, components, and circuits have not been described in detail so as not to unnecessarily obscure aspects of various embodiments of the present disclosure.

It is noted that although a method may be depicted herein as a sequence of operations for clarity, the described sequence of operations does not necessarily dictate the order of the operations. It should be understood that some of the operations may be skipped, performed in parallel, or performed without the requirement of maintaining a strict order of sequence.

The drawings showing various embodiments in accordance with the present disclosure are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the various embodiments in accordance with the present disclosure can be operated in any orientation.

Some portions of the detailed descriptions may be presented in terms of procedures, logic blocks, processing, and other symbolic representations of operations on data bits within a computer memory. These descriptions and representations are used by those skilled in the data processing arts to effectively convey the substance of their work to others skilled in the art.

In the present disclosure, a procedure, logic block, process, or the like, is conceived to be a self-consistent sequence of operations or instructions leading to a desired result. The operations are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "generating," "determining," "assigning," "aggregating," "utilizing," "virtualizing," "processing," "accessing," "executing," "storing," or the like, refer to action and processes of a computer system, or similar electronic computing device or processor.

The processing system, or similar electronic computing device or processor manipulates and transforms data represented as physical (electronic) quantities within the computer system memories, registers, other such information storage, and/or other computer readable media into other data similarly represented as physical quantities within the computer system memories or registers or other such information storage, transmission or display devices.

The technical solutions in the embodiments of the present application have been clearly and completely described in the prior sections with reference to the drawings of the embodiments of the present application. It should be noted that the terms "first," "second," and the like in the description and claims of the present invention and in the above drawings are used to distinguish similar objects and are not necessarily used to describe a specific sequence or order. It should be understood that these numbers may be interchanged where appropriate so that the embodiments of the present invention described herein can be implemented in orders other than those illustrated or described herein.

The functions described in the present embodiment, if implemented in the form of a software functional unit and sold or used as a standalone product, can be stored in a computing device readable storage medium. Based on such understanding, a portion of the embodiments of the present application that contributes to the prior art or a portion of the technical solution may be embodied in the form of a software product stored in a storage medium, including a plurality of instructions for causing a computing device (which may be a personal computer, a server, a mobile computing device, or a network device, and so on) to perform all or part of the steps of the methods described in various embodiments of the present application. The foregoing storage medium includes: a USB drive, a portable hard disk, a read-only memory (ROM), a random-access memory (RAM), a magnetic disk, an optical disk, and the like, which can store program code.

The various embodiments in the specification of the present application are described in a progressive manner, and each embodiment focuses on its difference from other embodiments, and the same or similar parts between the various embodiments may be referred to another case. The described embodiments are only a part of the embodiments, rather than all of the embodiments of the present application. All other embodiments obtained by a person of ordinary skill in the art based on the embodiments of the present application without departing from the inventive skills are within the scope of the present application.

The above embodiments are merely used for illustrating rather than limiting the technical solutions of the present invention. Although the present application is described in detail with reference to the foregoing embodiments, those of ordinary skill in the art should understand that the technical solutions recorded in the foregoing embodiments may still be modified or equivalent replacement may be made on part or all of the technical features therein. These modifications or replacements will not make the essence of the corresponding technical solutions be departed from the scope of the technical solutions in the embodiments of the present invention.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A parallel processing unit, comprising:
a core;
a cache coupled to the core;
a processor memory coupled to the core; and
an inter-chip network (ICN) controller coupled to the core, the ICN controller to have a routing table, the routing table to have a plurality of addresses that identify a plurality of memory spaces in a plurality of devices that are directly and indirectly coupled to the parallel processing unit, the plurality of memory spaces in the devices to have an equal size, and each address to identify a line of memory in a memory space
wherein, an external unit is directly or indirectly coupled to the parallel processing unit, wherein the external unit includes an extension memory such that the extension memory includes a plurality of memory spaces, and wherein the plurality of memory spaces have an equal size.

2. The parallel processing unit of claim 1, wherein the processor memory is partitioned into first and second address ranges such that the first address range is accessible by only the core, while the second address range is accessible by each device that is directly or indirectly coupled to the parallel processing unit as a shared address range.

3. The parallel processing unit of claim 1, wherein the ICN controller is coupled to each device that is directly coupled to the parallel processing unit.

4. The parallel processing unit of claim 3, further comprising a network-on-chip that couples together the core and the processor memory, and couples together the core and the ICN controller.

5. The parallel processing unit of claim 3, wherein the ICN controller has a number of ports that are directly coupled to one or more of the plurality of devices.

6. The parallel processing unit of claim 5, wherein an address in the routing table to identify one or more ports associated with the address.

7. A processing system, comprising:
a plurality of parallel processing units, each parallel processing unit including:
a core;
a cache coupled to the core;
a processor memory coupled to the core; and
a first inter-chip network (ICN) controller coupled to the core, the first ICN controller to have a first routing table, the first routing table to have a plurality of addresses that identify a plurality of memory spaces in a plurality of devices that are directly and indirectly coupled to the parallel processing unit, the plurality of memory spaces in the devices to have an equal size, and each address to identify a line of memory in a memory space; and
a plurality of external units that are directly and indirectly coupled to the plurality of parallel processing units, each external unit to include an extension memory such that the plurality of external units has a plurality of extension memories, the extension memory in each external unit to include a plurality of memory spaces, the plurality of memory spaces in the extension memories to have an equal size, each external unit to have a second routing table, and the first routing table to have a first plurality of addresses that identify the plurality of memory spaces in each extension memory of the plurality of external units.

8. The processing system of claim 7, wherein the plurality of memory spaces in each extension memory are accessible to each parallel processing unit as a shared memory space.

9. The processing system of claim 8, wherein the processor memory of a parallel processing unit is partitioned into first and second address ranges such that the first address range is accessible by only the core of the parallel processing unit, while the second address range is accessible by each of the other parallel processing units that are directly or indirectly coupled to the parallel processing unit as a shared address range.

10. The processing system of claim 9, wherein the first routing table to include addresses that identify a shared address range for each parallel processing unit.

11. The processing system of claim 10, wherein the second routing table of an external unit to have a second plurality of addresses that identify a shared address range for each parallel processing unit.

12. The processing system of claim 7, wherein the first ICN controller is coupled to each of the other parallel processing units and external units that are directly coupled to the parallel processing unit.

13. The processing system of claim 12, wherein the external unit further includes a second inter-chip network (ICN) controller that is coupled to the extension memory, and to the parallel processing units and the other external units that are directly coupled to the external unit.

14. The processing system of claim 13, wherein the parallel processing unit further includes a network-on-chip that couples together the core and the processor memory, and couples together the core and the first ICN controller.

15. The processing system of claim 12, wherein the first ICN controller has a number of ports that are directly coupled to one or more external units.

16. The processing system of claim 15, wherein an address in the first routing table to identify one or more ports associated with the address.

17. The processing system of claim 7, wherein each address has a first number of bits and a second number of bits, wherein the first number of bits identifies a memory space, and wherein the second number of bits identifies a line within the memory space.

18. A method of forming a parallel processing unit, the method comprising:
forming a core;
forming a cache coupled to the core;
forming a processor memory coupled to the core;
forming a routing table to have a plurality of addresses that identify a plurality of memory spaces in a plurality of devices that are directly and indirectly coupled to the parallel processing unit, the plurality of memory spaces in the devices to have an equal size, and each address to identify a line of memory in a memory space and
forming an extension memory in each external unit of a plurality of external units, such that the plurality of external units have a plurality of extension memories, the extension memory in each external unit to include a plurality of memory spaces, the plurality of memory spaces in the extension memories to have an equal size, wherein an external unit, of the plurality of external units, is directly or indirectly coupled to the parallel processing unit.

19. The method of claim 18, wherein the processor memory is partitioned into first and second address ranges such that the first address range is accessible by only the core, while the second address range is accessible by each device that is directly or indirectly coupled to the parallel processing unit as a shared address range.

20. The method of claim 19, further comprising forming an inter-chip network (ICN) controller that is coupled to the core and each device that is directly coupled to the parallel processing unit, the ICN controller to have a number of ports that are directly coupled to one or more of the plurality of devices, and an address in the routing table to identify one or more ports associated with the address.

* * * * *